(12) United States Patent
Mori et al.

(10) Patent No.: US 8,749,689 B2
(45) Date of Patent: Jun. 10, 2014

(54) DETECTING UNIT CONFIGURED TO DETECT TEMPERATURE OF IMAGE CAPTURING UNIT

(75) Inventors: Naomi Mori, Kawasaki (JP); Koji Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 13/176,571

(22) Filed: Jul. 5, 2011

(65) Prior Publication Data

US 2012/0026379 A1 Feb. 2, 2012

(30) Foreign Application Priority Data

Aug. 2, 2010 (JP) ................................. 2010-173966

(51) Int. Cl.
*H04N 5/222* (2006.01)
*H04N 3/14* (2006.01)

(52) U.S. Cl.
USPC ...................................... 348/333.02; 348/294

(58) Field of Classification Search
USPC ........................................... 348/333.02, 294
See application file for complete search history.

(56) References Cited

U.S. PATENT DOCUMENTS

| 2005/0083419 A1 | 4/2005 | Honda et al. |
| 2007/0285542 A1* | 12/2007 | Suzuki .......................... 348/294 |
| 2009/0091996 A1* | 4/2009 | Chen et al. ..................... 365/212 |

FOREIGN PATENT DOCUMENTS

| CN | 101252643 A | 8/2008 |
| CN | 101340524 A | 1/2009 |
| JP | 2007-158664 A | 6/2007 |
| JP | 2008-311915 A | 12/2008 |
| JP | 2009-033508 | 2/2009 |
| JP | 2009-111681 A | 5/2009 |

OTHER PUBLICATIONS

The above references were cited in a Jul. 24, 2013 Chinese Office Action, which is enclosed without an English Translation, that issued in Chinese Patent Application No. 201110220796.8.

* cited by examiner

*Primary Examiner* — Joel Fosselman

(74) *Attorney, Agent, or Firm* — Cowan, Liebowitz & Latman, P.C.

(57) ABSTRACT

An image capturing apparatus has a plurality of predetermined temperatures to be compared with the temperature of an image sensor. Every time a detected temperature of the image sensor exceeds one of the plurality of temperatures, a different predetermined indication corresponding to the predetermined temperature is displayed on a display device together with an image signal output from the image sensor, thereby giving a warning to the user.

14 Claims, 5 Drawing Sheets

DETECTING UNIT CONFIGURED TO DETECT TEMPERATURE OF IMAGE CAPTURING UNIT

BACKGROUND OF THE INVENTION

1. Field of the Invention

The present invention relates to a technique for indicating a warning about the temperature of an image sensor.

2. Description of the Related Art

An image capturing apparatus such as a digital camera includes an image sensor such as a CCD or CMOS sensor, and can process an optical image, formed on the image sensor by an optical system, as an image signal by photoelectrically converting the optical image. The obtained image signal is output to a display device of the image capturing apparatus to be displayed (live-view displayed), thereby enabling the display device to function as an electronic viewfinder.

On the other hand, while the display device functions as an electronic viewfinder, the temperature of the image sensor increases due to conversion processing. It is known that as the temperature of the image sensor increases, noise occurs in the photoelectrically converted image signal, thereby causing image quality degradation in a still image captured and obtained immediately after using the display device as an electronic viewfinder.

Japanese Patent Laid-Open No. 2009-033508 discloses a technique for displaying a warning when the temperature of an image sensor exceeds a set limit value, and for forcibly stopping live view display when the temperature reaches a predetermined use limit temperature, in order to prevent image quality degradation in a still image.

However, for a moving image, since a user rarely browses one frame of the moving image for a long time unlike a still image, it is possible to allow some noise caused by a high temperature of the image sensor. That is, the temperature of the image sensor at which it is possible to capture a moving image with image quality degradation unperceivable by the user can be set higher than that at which the user perceives image quality degradation in a still image. Since the display device of the image capturing apparatus used as an electronic viewfinder is typically a low-resolution display device, its allowable noise level is higher as compared with a captured and obtained moving image.

In the technique described in Japanese Patent Laid-Open No. 2009-033508, since live view display is stopped when the temperature of the image sensor reaches a predetermined temperature at which image quality degradation occurs in a obtained still image, live view display does not restart until the temperature of the image sensor falls to a predetermined temperature or below. That is, the user may not be able to capture a moving image while browsing the electronic viewfinder, or to use the electronic viewfinder instead of a telescope.

SUMMARY OF THE INVENTION

The present invention has been made in consideration of the problems of the conventional technique. The present invention provides a technique for indicating, step by step, to the user an operation to be warned depending on the temperature of an image sensor.

The present invention in its first aspect provides an image capturing apparatus comprising: an image capturing unit; a detecting unit configured to detect a temperature of the image capturing unit; a display control unit configured to perform live view display for displaying, in series, images successively captured by the image capturing unit on a display unit; and a control unit configured to control, every time the temperature of the image capturing unit detected by the detecting unit exceeds one of a plurality of temperatures, the display unit to display a different predetermined indication corresponding to the temperature while the live view display is performed.

Further features of the present invention will become apparent from the following description of exemplary embodiments (with reference to the attached drawings).

DESCRIPTION OF THE EMBODIMENTS

With reference to the accompanying drawings, a preferred embodiment of the present invention will be described in detail below. In the embodiment to be explained below, the present invention is applied to a digital camera, as an example of an image capturing apparatus, capable of detecting the temperature of an image sensor and outputting it to the display device of the image capturing apparatus.

Figure 1:
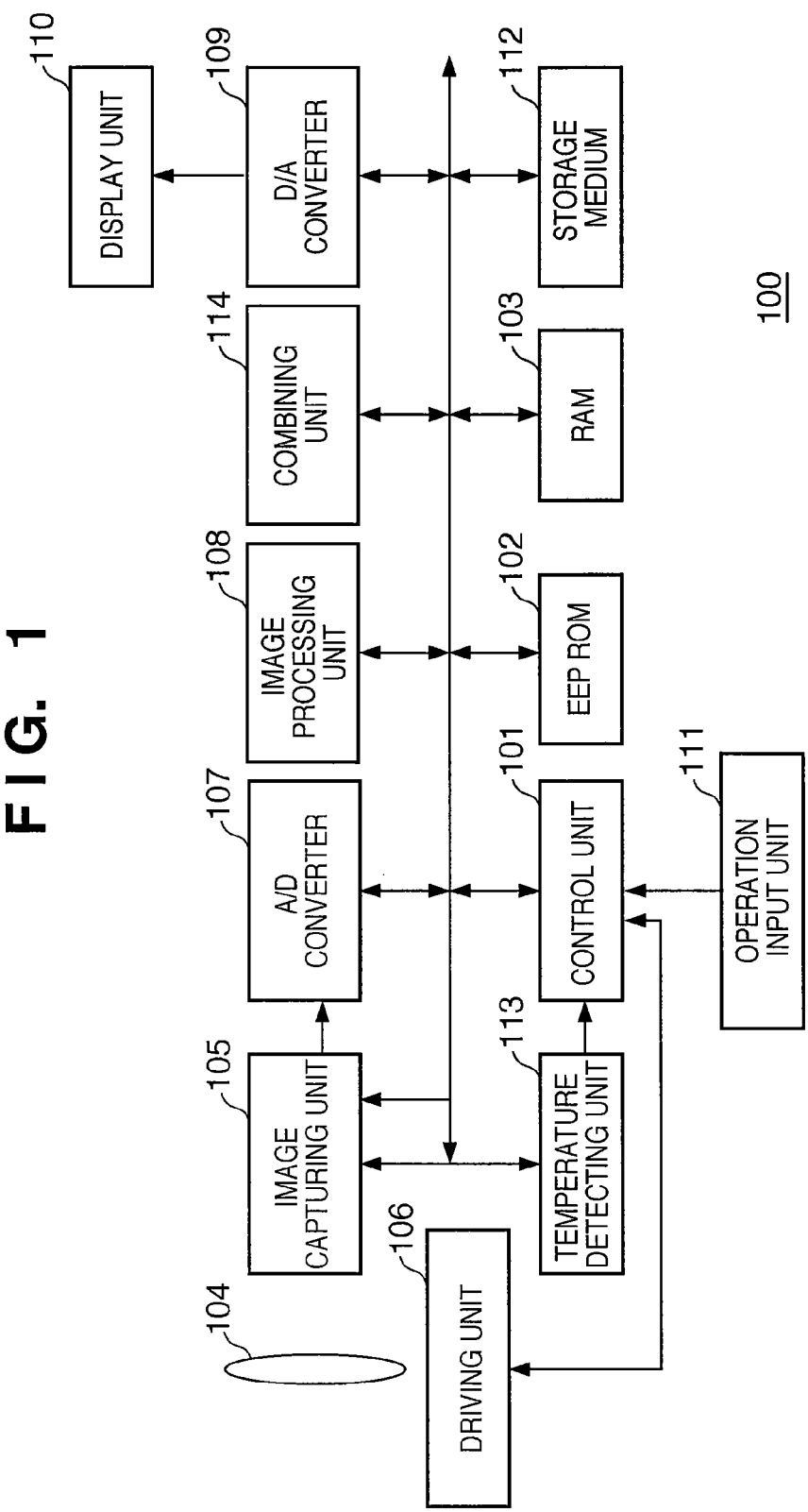
FIG. 1 a block diagram showing the functional configuration of a digital camera according to an embodiment of the present invention.

FIG. 1 is a block diagram showing the functional configuration of a digital camera 100 according to the embodiment of the present invention.

A control unit 101 is, for example, a CPU, which controls the operation of each block of the digital camera 100 by reading out an operation program for each block of the digital camera 100 from an EEPROM 102, mapping the program on the RAM 103, and then executing the program. The EEPROM 102 is a rewritable non-volatile memory, which stores parameters and the like necessary for the operation of each block as well as the operation program for each block of the digital camera 100. The EEPROM 102 also stores GUI data and the like associated with various indications to be displayed on a display unit 110 (to be described later). The RAM 103 is a rewritable volatile memory, which is used as a temporary storage area for data and settings output in the operation of each block of the digital camera 100, or as an operation area for the operation of each block.

An image capturing unit 105 is, for example, an image sensor such as a CCD or CMOS sensor, which photoelectrically converts an optical image formed by an optical system 104 including an imaging lens and focus lens, and outputs an image signal (analog image signal) to an A/D converter 107. Note that the image capturing unit 105 can capture a desired focal length or zoom position when a driving unit 106 drives the optical system 104 on an optical axis. The A/D converter 107 executes A/D conversion processing for the analog image signal input by the image capturing unit 105, and outputs obtained digital image data. An image processing unit 108 performs predetermined signal processing such as signal level adjustment, pixel interpolation, color conversion, and compression/decompression processing for the digital image data output from the A/D converter 107, and then outputs obtained digital image data to a storage medium 112. The storage medium 112 is, for example, a storage device such as an internal memory of the digital camera 100, or a memory card or HDD detachably connected to the digital camera 100, which records the digital image data output from the image processing unit 108.

A D/A converter 109 executes D/A conversion processing for the digital image data output from the A/D converter 107 and the digital image data recorded on the storage medium 112, and then outputs an obtained analog image signal to the display unit 110. The display unit 110 is, for example, a display device such as a small LCD, and displays the input analog image signal. Note that the display unit 110 functions as an electronic viewfinder by inputting analog image signals successively captured and obtained by the image capturing unit 105 to the display unit 110 through the A/D converter 107 and D/A converter 109, and displaying (live-view displaying) the processed signals on the display unit 110. If GUI data and the like are superimposed on the analog image signals on the display unit 110, digital image data combined with the GUI data by a combining unit 114 is output to the D/A converter 109. For example, the GUI data read out from the EEPROM 102 by the control unit 101 and the digital image data output from the A/D converter 107 are input to the combining unit 114. The combining unit 114 combines the input data so that the GUI data is located at a predetermined position of the digital image data. The combined digital image data is output to the D/A converter 109, and displayed on the display unit 110 after D/A conversion.

An operation input unit 111 analyzes an operation input given by the user operation of the operation member (not shown) of the digital camera 100, and transmits the given input instruction to the control unit 101. The operation member (not shown) includes a menu dial for switching the operation mode of the digital camera 100 among a still image capturing mode, a moving image capturing mode, an image browse mode, and the like, a release button for instructing image capturing, and a display button for switching between enabling and disabling of live view display on the above-described display unit 110.

The digital camera 100 of this embodiment has a temperature detecting unit 113 which detects the temperature of an image sensor as the image capturing unit 105. The temperature detecting unit 113 serves as, for example, a temperature sensor, which detects the temperature of the whole image sensor, and transmits information about the detected temperature to the control unit 101. Assume that the digital camera 100 has four predetermined temperature thresholds as shown below, and information about the plurality of thresholds is stored in the EEPROM 102. That is, assume that the digital camera 100 of this embodiment has the following four temperature thresholds in ascending order:

first temperature T1: a temperature at which noise regarded as image quality degradation occurs in a still image obtained by a still image capturing operation;

second temperature T2: a temperature at which noise regarded as image quality degradation occurs in a moving image obtained by a moving image capturing operation;

third temperature T3: a temperature at which it is indicated in advance that the temperature of the image sensor will soon reach a tolerance limit temperature and live view display will end; and fourth temperature T4: a temperature at which the temperature of the image sensor has reached the tolerance limit temperature, and live view display ends.

Figure 2:
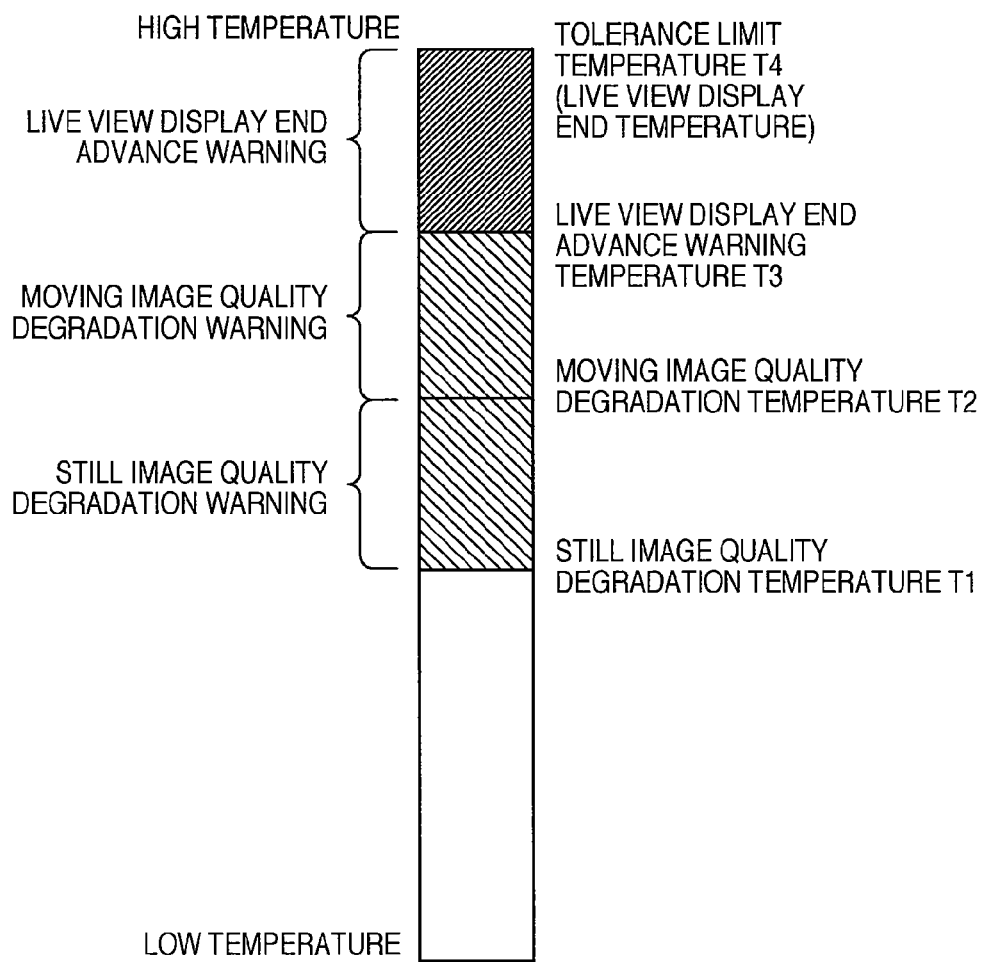
FIG. 2 is a view for explaining temperature thresholds according to the embodiment of the present invention.
Figure 3:
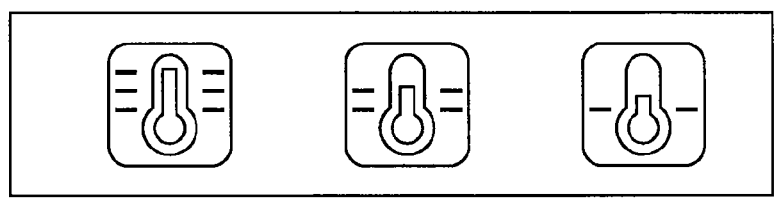
FIG. 3 is a view showing examples of an indication GUI associated with an image sensor temperature warning according to the embodiment of the present invention.
Figure 4A:
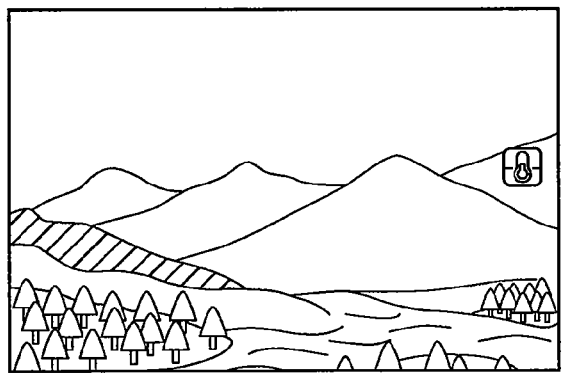
FIGS. 4A, 4B, and 4C are views each showing a GUI associated with a temperature warning displayed on a display unit according to the embodiment of the present invention.
Figure 4B:
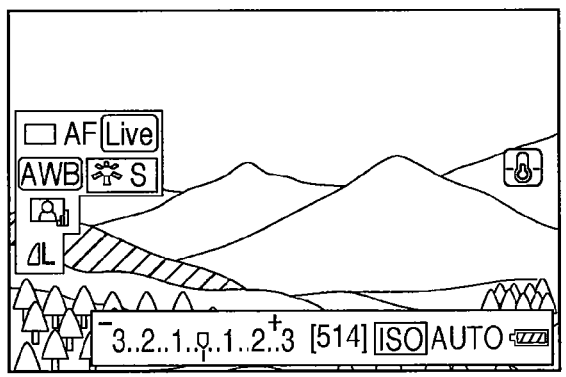
Figure 4C:
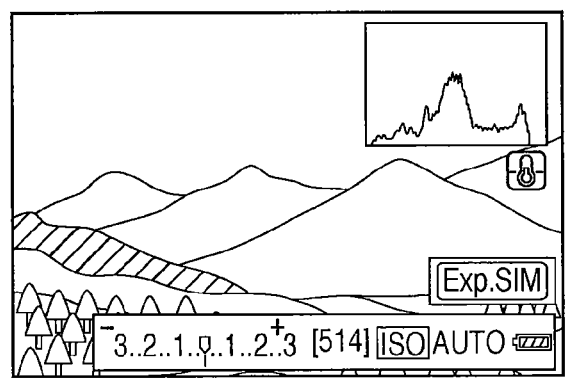

Assume also that as shown in FIG. 2, an indication associated with an image sensor temperature warning to be displayed on the display unit 110 varies depending on a temperature threshold range. Indication GUIs associated with temperature warnings may be, for example, icons shown in FIG. 3 by which the user can intuitively recognize a temperature, and any display method including a method of blinking the icon may be applicable. Assume that since an indication associated with a temperature warning indicates to the user image quality degradation in still image capturing or moving image capturing, display of the indication GUI is repeated as long as the temperature of the image sensor falls within a range in which an indication is necessary, regardless of whether another GUI is displayed as shown in FIGS. 4A to 4C.

The above-described four predetermined temperature thresholds have a relationship of $T1<T2<T3<T4$. That is, as compared with a still image, since the user rarely browses one frame of a moving image for a long time, the user browsing the moving image perceives less image quality degradation in the moving image even if a high temperature of the image sensor causes noise to some extent. The temperature (T2) of the image sensor at which noise regarded as image quality degradation occurs in moving image capturing is set higher than the temperature (T1) of the image sensor at which noise regarded as image quality degradation occurs in still image capturing. If live view display is performed on a display area with a low spatial resolution such as a small LCD like the display unit 110 of the digital camera 100, the user perceives less image quality degradation as compared with a case of browsing a moving image because of the size of the display area. Therefore, noise level allowed in live view display for only displaying an image in a small screen in real time is high as compared with a moving image capturing operation for recording a moving image which may be browsed on a large screen later. For this reason, the temperature (T3) of the image sensor at which it is indicated in advance that live view display will end and the temperature (T4) at which live view display actually ends are set higher than the temperature (T2) at which noise regarded as image quality degradation occurs in moving image capturing.

Although the four thresholds and three temperature ranges are set in advance with respect to the temperature of the image sensor in this embodiment, the present invention is not limited to this. That is, in the present invention, at least two thresholds are set, and if a detected temperature of the image sensor is determined to exceed each threshold, the control unit 101 controls to display a different indication associated with each image sensor temperature warning on the display unit 110. Note that the thresholds for the temperature of the image sensor may vary depending on the sensitivity setting of the digital camera 100 when capturing an image, and the like.

Temperature Warning Display Processing

Figure 5:
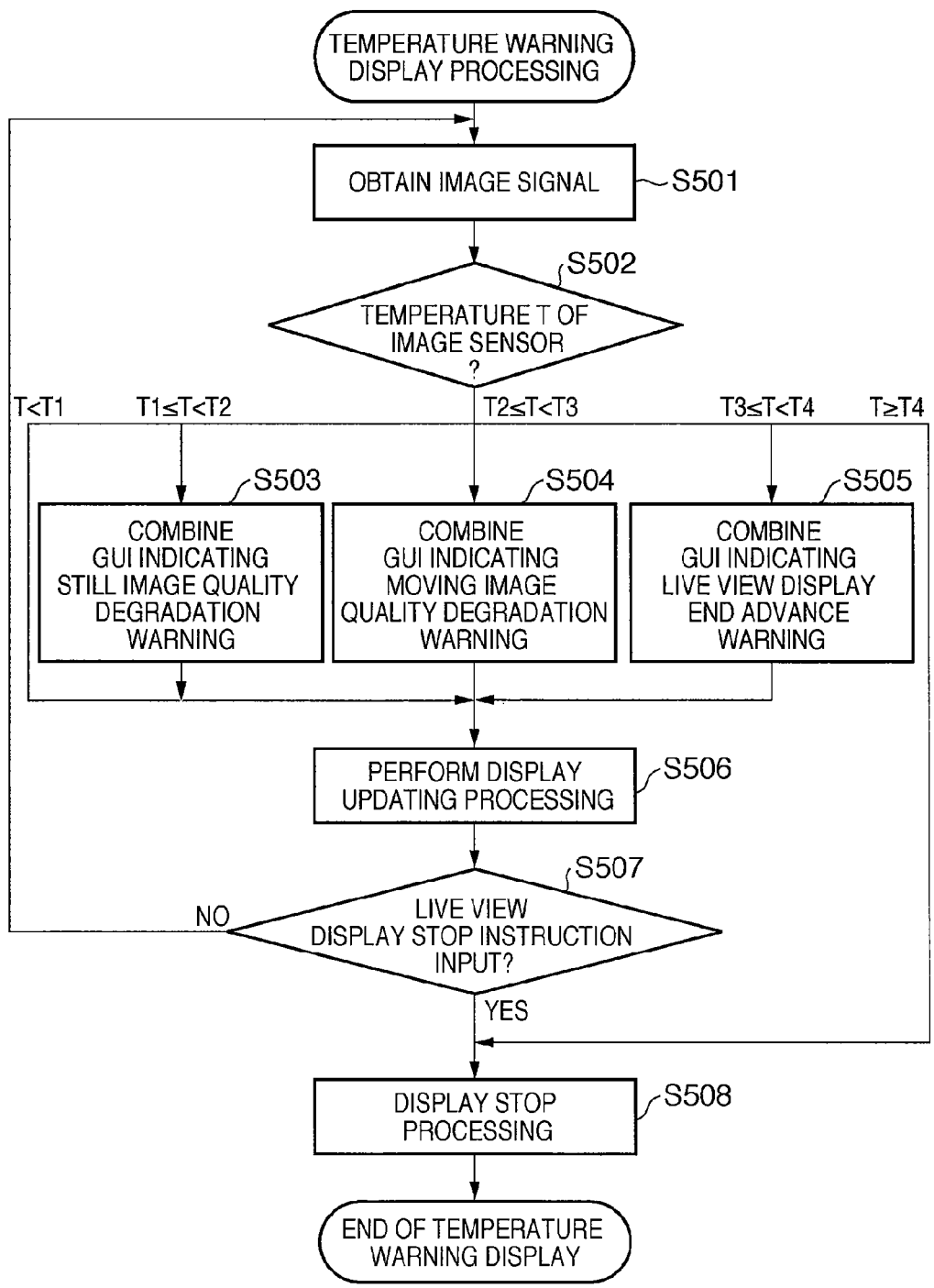
FIG. 5 is a flowchart illustrating temperature warning display processing according to the embodiment of the present invention.

Temperature warning display processing of the digital camera 100 with such configuration according to this embodiment will be described in detail with reference to the flowchart of FIG. 5. It is possible to implement processing corresponding to the flowchart when, for example, the control unit 101 reads out a corresponding processing program stored in the EEPROM 102, maps the program on the RAM 103, and then executes the program. Assume that the temperature warning display processing starts when, for example, the digital camera 100 is activated in a mode in which a still image or moving image is captured, and the processing is executed while live view display is performed on the display unit 110.

In step S501, the control unit 101 obtains an image signal to be displayed on the display unit 110. More specifically, the control unit 101 causes the image capturing unit 105 to output an analog image signal, causes the A/D converter 107 to perform A/D conversion processing for the obtained analog image signal, and causes the RAM 103 to store the thus obtained digital image data.

In step S502, the control unit 101 compares a temperature Tin of the image sensor detected by the temperature detecting unit 113 with the respective four temperature thresholds which have been set in advance and stored in the EEPROM 102. If the temperature of the image sensor falls within the range from T1 (inclusive) to T2 (exclusive), the control unit 101 advances the process to step S503. If the temperature of the image sensor falls within the range from T2 (inclusive) to T3 (exclusive), the control unit 101 advances the process to step S504. If the temperature of the image sensor falls within the range from T3 (inclusive) to T4 (exclusive), the control unit 101 advances the process to step S505. Furthermore, if the temperature of the image sensor is lower than T1, the control unit 101 advances the process to step S506. If the temperature of the image sensor is not lower than T4, the control unit 101 advances the process to step S508.

In step S503, upon capturing a still image, noise occurs in the obtained still image, and thus the control unit 101 combines an indication indicating that image quality degradation occurs with the obtained image signal. More specifically, the control unit 101 reads out digital image data which has been stored in the RAM 103, and GUI data which has been stored in the EEPROM 102 and indicates that image quality degradation occurs in a still image in still image capturing, and then outputs them to the combining unit 114. The control unit 101 causes the combining unit 114 to combine the digital image data and GUI data so that the GUI data is located at a predetermined position on the digital image data.

In step S504, upon capturing a moving image, noise occurs in the obtained moving image, and thus the control unit 101 combines an indication indicating that image quality degradation occurs with the obtained image signal. More specifically, the control unit 101 reads out digital image data which has been stored in the RAM 103, and GUI data which has been stored in the EEPROM 102 and indicates that degradation occurs in a moving image in moving image capturing, and then outputs them to the combining unit 114. The control unit 101 causes the combining unit 114 to combine the digital image data and GUI data so that the GUI data is located at a predetermined position on the digital image data.

In step S505, the control unit 101 combines, with the obtained image signal, an indication which indicates, in advance, to the user that the temperature of the image sensor approaches the tolerance limit temperature (T4) and that live view display ends when the temperature of the image sensor reaches the tolerance limit temperature. More specifically, the control unit 101 reads out digital image data which has been stored in the RAM 103, and GUI data which has been stored in the EEPROM 102 and indicates in advance that live view display ends, and then outputs them to the combining unit 114. The control unit 101 causes the combining unit 114 to combine the digital image data and GUI data so that the GUI data is located at a predetermined position on the digital image data.

In step S506, the control unit 101 causes the combining unit 114 to output, to the D/A converter 109, digital image data obtained by combining the digital image data as a captured image and the GUI data, causes the D/A converter 109 to perform D/A conversion processing for the received data, and causes the display unit 110 to display the processed data. If the temperature of the image sensor is determined in step S502 to be lower than T1, the display unit 110 only displays the image signal.

In step S507, the control unit 101 determines whether the user gives an operation input for switching between enabling and disabling of live view display. More specifically, the control unit 101 determines whether an operation instruction for switching between displaying and nondisplaying of live view display, that is, an operation instruction for stopping outputting the image signal to the display unit 110 is received from the operation input unit 111. If the operation instruction is received, the control unit 101 advances the process to step S508; otherwise, the control unit 101 returns the process to step S501.

In step S508, the control unit 101 controls the image capturing unit 105 not to photoelectrically convert an optical image while stopping live view display on the display unit 110 by controlling to stop power supply to the display unit 110. The temperature warning display processing thus ends.

In this embodiment, only an image signal captured by the image capturing unit 105 and an indication associated with an image sensor temperature warning are combined to be displayed on the display unit 110. The present invention is not limited to this. That is, it will readily occur to those skilled in the art that if the user operates to switch to display information in image capturing such as a histogram, and the like, GUI data such as the information in image capturing is also combined. If the user operates to switch to a mode in which live view display is not performed, such as an image browse mode, the temperature warning display processing is terminated and it is unnecessary to display an indication associated with an image sensor temperature warning on the display unit 110.

As described above, the image capturing apparatus of this embodiment can indicate, step by step, to the user an operation to be warned depending on the temperature of the image sensor. More specifically, the image capturing apparatus has a plurality of predetermined temperatures to be compared with the temperature of the image sensor. Every time a detected temperature of the image sensor exceeds one of the plurality of predetermined temperatures, a different predetermined indication corresponding to the predetermined temperature is displayed on the display device together with an image signal output from the image sensor, thereby giving a warning to the user.

In this way, the user can determine whether the temperature of the image sensor is such that image quality degradation in a captured and obtained still image is noticeable but image quality degradation in a moving image is unnoticeable or such that image quality degradation is noticeable when capturing a moving image. That is, for example, it is possible to avoid a situation that even if the temperature of the image sensor is such that it is possible to capture a moving image without any problem, an image sensor temperature warning is displayed, thereby missing an opportunity of capturing an image. Note that the temperature of the image sensor lowers when live view display ends. Therefore, if the user checks a temperature waning given step by step, and then finds that image quality degradation will occur in target capturing processing, the user can perform target capturing processing without any image quality degradation by terminating live view display to decrease the temperature, and restarting live view display after a while.

Modification of the Embodiment

In the above-described embodiment, the method in which a warning is indicated depending on the temperature of the image sensor and then the user determines whether it is possible to capture an image has been explained. In this modification, unlike the above-described embodiment, a method of determining the temperature of the image sensor, and disabling the user from capturing an image will be explained. The functional configuration of the digital camera 100 according to the modification is assumed to be the same as that of the digital camera 100 according to the above-described embodiment and a description thereof will be omitted.

Temperature Warning Display Processing

Figure 6:
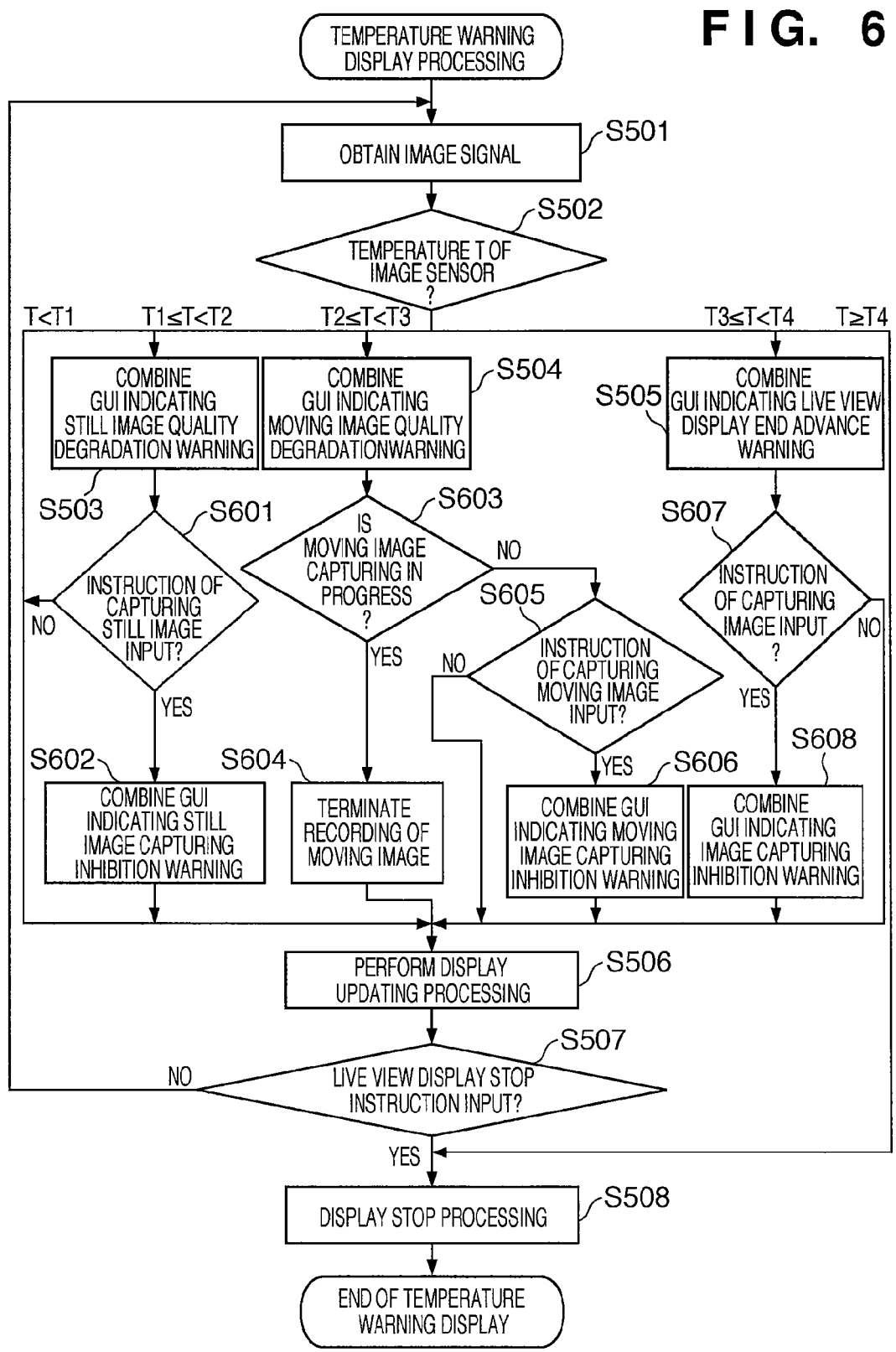
FIG. 6 is a flowchart illustrating temperature warning display processing according to a modification of the embodiment of the present invention.

Temperature warning display processing of the digital camera 100 according to the modification will be explained in detail with reference to the flowchart of FIG. 6. It is possible to implement processing corresponding to the flowchart when the control unit 101 reads out a corresponding processing program stored in the EEPROM 102, maps the program on the RAM 103, and then executes the program. Assume that the temperature warning display processing starts when, for example, the digital camera 100 is activated in a mode in which a still image or moving image is captured, and the processing is executed while live view display is performed on the display unit 110. In the temperature warning display processing, the same reference symbols are given to steps of the same processes as in the above-described embodiment and a description thereof will be omitted. Only processes of characteristic steps in this modification will be explained.

If the temperature of the image sensor falls within the rage from T1 (inclusive) to T2 (exclusive), the control unit 101 determines in step S601 whether the user gives an operation instruction of capturing a still image. More specifically, the control unit 101 determines whether an operation instruction of capturing a still image is received from the operation input unit 111. If the operation instruction is received, the control unit 101 advances the process to step S602; otherwise, the control unit 101 advances the process to step S506.

In step S602, the control unit 101 does not record a still image but reads out, from the EEPROM 102, GUI data indicating that still image capturing is prevented, and outputs it to the combining unit 114 to perform combining processing.

If the temperature of the image sensor falls within the range from T2 (inclusive) to T3 (exclusive), the control unit 101 determines in step S603 whether the digital camera 100 is presently capturing a moving image. If the digital camera 100 is presently capturing a moving image, the control unit 101 advances the process to step S604; otherwise, the control unit 101 advances the process to step S605.

In step S604, the control unit 101 forcibly terminates processing of recording a moving image regardless of whether an operation instruction of aborting moving image capturing is given. The control unit 101 outputs, to the combining unit 114, GUI data which has been stored in the EEPROM 102 and indicates that moving image capturing has been terminated because of the prospect of image quality degradation, and causes the combining unit 114 to perform combining processing.

The control unit 101 determines in step S605 whether the user gives an operation instruction of capturing a moving image. More specifically, the control unit 101 determines whether an operation instruction of capturing a moving image is received from the operation input unit 111. If the operation instruction is received, the control unit 101 advances the process to step S606; otherwise, the control unit 101 advances the process to step S506.

In step S606, the control unit 101 does not record a moving image but outputs, to the combining unit 114, GUI data which has been stored in the EEPROM 102 and indicates that moving image capturing is prevented, and causes the combining unit 114 to perform combining processing. If the operation instruction of capturing a still image is input in step S605, the control unit 101 outputs the GUI data indicating that still image capturing is prevented to the combining unit 114 to perform combining processing as in step S602.

If the temperature of the image sensor falls within the range from T3 (inclusive) to T4 (exclusive), the control unit 101 determines in step S607 whether the user gives an operation instruction of capturing a still image or moving image. More specifically, the control unit 101 determines whether an operation instruction of capturing a moving image is received from the operation input unit 111. If the operation instruction is received, the control unit 101 advances the process to step S608; otherwise, the control unit 101 advances the process to step S506.

In step S608, the control unit 101 reads out, from the EEPROM 102, GUI data corresponding to the operation instruction detected in step S607, and outputs it to the combining unit 114 to perform combining processing. That is, if the operation instruction of capturing a still image is input by the user, the control unit 101 outputs the GUI data indicating that still image capturing is prevented to the combining unit 114, as in step S602. If the user gives the operation instruction of capturing a moving image, the control unit 101 outputs the GUI data indicating that moving image capturing is prevented to the combining unit 114, as in step S606.

As described above, the image capturing apparatus of this embodiment can indicate to the user a more detailed warning by determining the temperature of the image sensor, and control not to capture an image even if the user gives an instruction of capturing an image without noticing the warning. That is, it is possible to avoid capturing a still image and moving image with image quality degradation, thereby providing the user with a still image and moving image captured under good image capturing conditions.

In the above-described modification, the method of preventing a still image and moving image for recording from being captured has been explained. The present invention, however, is not limited to this. For example, a manual white balance (MWB) setting procedure of manually setting the white balance requires a step of capturing a reference image for the white balance, that is, an image defining white. If the temperature of the image sensor is high, however, it is impossible to appropriately adjust the white balance since noise occurs in the image defining white. Similarly, some image capturing apparatuses store, together with a captured image, dust delete data for specifying the position of a foreign substance such as dust adhered to the image sensor or a lens so as to delete the foreign substance from the image by image processing. Such dust delete data is generated by recognizing the position of a foreign substance in an image obtained by capturing a white object so that the whole visual field becomes white. If the temperature of the image sensor is high, noise occurs and it is impossible to obtain an appropriate image processing result because, for example, a portion of the noise is misrecognized as the position of a foreign substance. In the present invention, therefore, if the temperature of the image sensor exceeds the first temperature, a reference image for the white balance and dust delete data may be controlled not to be captured.

One hardware component may control the control unit 101, or a plurality of hardware components may share processing, thereby controlling the image capturing apparatus as a whole.

The present invention has been described in detail with reference to the preferred embodiments but is not limited to them. The present invention includes various modifications without departing from the spirit and scope of the invention. The above-described embodiments are merely examples, and the embodiments can be combined as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-173966, filed Aug. 2, 2010, which is hereby incorporated by reference herein in its entirety.

What is claimed is:

1. An image capturing apparatus comprising:
an image capturing unit;
a detecting unit configured to detect a temperature of said image capturing unit;
a display control unit configured to perform live view display for displaying, in series, images successively captured by said image capturing unit on a display unit; and
a control unit configured to control, in a case where the temperature detected by said detecting unit exceeds a first temperature, the display unit to display a first indication while the live view display is performed, to control, in a case where the temperature detected by said detecting unit exceeds a second temperature higher than the first temperature, the display unit to display a second indication, which is different from the first indication, while the live view display is performed, and not to prevent, in a case where the temperature detected by said detecting unit falls within the range from the first temperature to the second temperature and the display unit displays the first indication, said image capturing unit from capturing a moving image.

2. The apparatus according to claim 1, wherein said control unit controls, the temperature detected by said detecting unit exceeds a third temperature higher than the second temperature, the display unit to display a third indication, which is different from the first indication and the second indication.

3. The apparatus according to claim 2, wherein
the first indication indicates that degradation occurs in a captured still image in still image capturing,
the second indication indicates that degradation occurs in a captured moving image in moving image capturing, and
the third indication indicates, in advance, that the live view display on the display unit ends.

4. The apparatus according to claim 2, wherein when the temperature detected by said detecting unit exceeds a fourth temperature higher than the third temperature, said control unit terminates the live view display.

5. The apparatus according to claim 1, wherein in a case where the temperature detected by said detecting unit exceeds the second temperature, said control unit prevents said image capturing unit from capturing a moving image.

6. The apparatus according to claim 1, wherein in a case where the temperature detected by said detecting unit exceeds the first temperature, said control unit prevents said image capturing unit from capturing a still image for recording.

7. The apparatus according to claim 6, wherein in a case where the temperature detected by said detecting unit exceeds the first temperature, said control unit prevents said image capturing unit from capturing a reference still image for a manual white balance.

8. The apparatus according to claim 6, wherein in a case where the temperature detected by said detecting unit exceeds the first temperature, said control unit prevents said image capturing unit from capturing an image for specifying a position of a foreign substance adhered to an optical system or said image capturing unit.

9. The apparatus according to claim 1, wherein the first indication indicates that degradation occurs in a captured still image in still image capturing.

10. The apparatus according to claim 1, wherein the first indication indicates that degradation occurs in a captured still image in still image capturing and does not occur in a captured moving image in moving image capturing.

11. A control method for an image capturing apparatus having an image capturing unit, comprising:
a detecting step of detecting a temperature of the image capturing unit;
a display control step of performing live view display for displaying, in series, images successively captured by the image capturing unit on a display unit; and
a control step of controlling, in a case where the temperature detected in the detecting step exceeds a first temperature, to display a first indication while the live view display is performed, and to control, in a case where the temperature detected in the detecting step exceeds a second temperature higher than the first temperature, the display unit to display a second indication, which is different from the first indication, while the live view display is performed, and not to prevent, in a case where the temperature detected by the detecting step falls within the range from the first temperature to the second temperature and the display unit displays the first indication, said image capturing unit from capturing a moving image.

12. A non-transitory computer readable storage medium which records a program for causing a computer to execute each step of a control method for an image capturing apparatus according to claim 11.

13. An image capturing apparatus comprising:
an image capturing unit;

a detecting unit configured to detect a temperature of said image capturing unit;

a display control unit configured to perform live view display for displaying, in series, images successively captured by said image capturing unit on a display unit; and a control unit configured to control, every time the temperature detected by said detecting unit exceeds one of a plurality of temperatures, the display unit to display a different predetermined indication while the live view display is performed, wherein the plurality of temperatures include at least two of a first temperature, a second temperature higher than the first temperature, and a third temperature higher than the second temperature, if the plurality of temperatures include the first temperature, when the temperature of said image capturing unit detected by said detecting unit exceeds the first temperature, said control unit prevents said image capturing unit from capturing a still image for recording, and in a case where the temperature detected by said detecting unit exceeds the first temperature, said control unit prevents said image capturing unit from capturing a reference still image for a manual white balance.

14. An image capturing apparatus comprising:

an image capturing unit;

a detecting unit configured to detect a temperature of said image capturing unit;

a display control unit configured to perform live view display for displaying, in series, images successively captured by said image capturing unit on a display unit; and a control unit configured to control, every time the temperature detected by said detecting unit exceeds one of a plurality of temperatures, the display unit to display a different predetermined indication while the live view display is performed, wherein the plurality of temperatures include at least two of a first temperature, a second temperature higher than the first temperature, and a third temperature higher than the second temperature, if the plurality of temperatures include the first temperature, when the temperature of said image capturing unit detected by said detecting unit exceeds the first temperature, said control unit prevents said image capturing unit from capturing a still image for recording, and in a case where the temperature detected by said detecting unit exceeds the first temperature, said control unit prevents said image capturing unit from capturing an image for specifying a position of a foreign substance adhered to an image sensor or optical system of said image capturing unit.

* * * * *